US009969962B2

(12) United States Patent
Hansmann et al.

(10) Patent No.: US 9,969,962 B2
(45) Date of Patent: May 15, 2018

(54) MODULAR STAND FOR HOME BEER BREWING

(71) Applicant: Northern Brewer LLC, Roseville, MN (US)

(72) Inventors: John Thomas Hansmann, Minneapolis, MN (US); Bruce J. Newman, Byrn Mawr, PA (US)

(73) Assignee: Northern Brewer, LLC, Roseville, MN (US)

( * ) Notice: Subject to any disclaimer, the term of this patent is extended or adjusted under 35 U.S.C. 154(b) by 419 days.

(21) Appl. No.: 14/230,520

(22) Filed: Mar. 31, 2014

(65) Prior Publication Data

US 2015/0275160 A1   Oct. 1, 2015

(51) Int. Cl.
| | |
|---|---|
| *C12C 7/06* | (2006.01) |
| *C12C 13/06* | (2006.01) |
| *C12C 13/10* | (2006.01) |
| *C12C 7/20* | (2006.01) |
| *A47F 5/06* | (2006.01) |

(52) U.S. Cl.
CPC .............. *C12C 13/06* (2013.01); *A47F 5/06* (2013.01); *C12C 7/20* (2013.01); *C12C 13/10* (2013.01)

(58) Field of Classification Search
CPC ....... A47B 47/00; A47B 47/0091; A47F 5/06; A47G 33/12; A47G 33/1206; C12C 13/06; C12C 13/10; C12C 7/20; F16M 11/24

USPC ............................................. 99/278; 248/159
See application file for complete search history.

(56) References Cited

U.S. PATENT DOCUMENTS

| | | | | |
|---|---|---|---|---|
| 2,789,703 | A * | 4/1957 | Kurtz | A47B 57/045 211/171 |
| 5,906,284 | A * | 5/1999 | Hammerstrom | B25H 1/02 211/107 |
| 8,152,115 | B2 † | 4/2012 | Blichmann | |
| 2009/0308992 | A1 * | 12/2009 | Blichmann | C12C 13/10 248/159 |
| 2012/0240458 | A1 * | 9/2012 | Ganske | A47G 7/041 47/39 |

* cited by examiner
† cited by third party

*Primary Examiner* — Brian Jennison

(57) ABSTRACT

A modular home beer brewing stand includes: a base having a center post and three or more adjustable legs, a first leg fixedly attached to the center post with holes, a second leg attached via a first hinge to the first leg and attached via a second hinge to a third leg; a leg pin to secure the legs into a fixed open position surrounding the center post; and modules each having an integrally attached support post with a female end and a male end and each end having matching holes, wherein the male end of a first selected module is inserted into the center post, holes are aligned and a first extension pin is placed through the holes to form a first tier of the stand located vertically above a ground level.

30 Claims, 3 Drawing Sheets

MODULAR STAND FOR HOME BEER BREWING

FIELD OF THE INVENTION

The present invention relates generally to a modular home beer brewing stand for brewing beer and making wort, and more specifically to a modular home beer brewing stand having a base and multiple modules that can be easily assembled by hand, without the use of any tools.

BACKGROUND

Conventional home beer brewing equipment typically includes multiple pots or vessels such as: a pot for holding hot water; a mash tun pot used in the mashing process to create wort by converting the starches in crushed grains into sugars for fermentation; a boil pot or brew kettle; and a carboy for fermentation. Other equipment is also used in conjunction with the pots as needed or desired for a particular brewing method. The liquids are transferred from one pot to another by pouring, using pumps, siphoning or by opening a spout near the bottom of a vessel and allowing gravity to drain the liquid into another vessel.

In order to minimize the footprint of a beer brewing system and to utilize gravity for transferring liquids from vessel to vessel, it is known in the industry to provide a stand or support for one or more pots. For instance, U.S. Pat. No. 8,152,115 issued to Blichmann on Apr. 10, 2012 discloses a home beer brewing stand designed to place devices such as pots on different vertical levels during the process of brewing beer. The Blichmann stand includes a singular mast having a multitude of T-slots or holes for bolting together arms, legs, shelves and other components thereto.

BRIEF SUMMARY OF EMBODIMENTS

There is a need for improvements in home beer brewing, particularly for a modular home beer brewing stand which can be easily and quickly modified, assembled, dis-assembled and stored by hand without the need for tools in a time-saving, cost-saving manner.

It is also desirable to provide a home beer brewing stand which uses a small footprint, and which has modular components that can easily be rotated about an axis of the stand according to the particular orientation and needs of the home brewer.

A modular home beer brewing stand that can be easily hand assembled without tools, includes: a base with three or more foldable legs, a first leg being permanently attached to a cylindrical center post around which the other legs are hinged to one another and unfolded when the base is assembled, a last leg being attachable to the first leg during assembly without tools via a hand inserted first extension pin, said legs capable of being folded together into a compact space via the hinges when the extension pin is removed and the base is dis-assembled; one or more modules for mounting into the center post of the base to create tiers at different vertical distances above the base, each of the modules comprising a cylindrical support post including a female end and a male end for stacking the modules, wherein the male end of the support post of a first module is inserted into the center post and secured with a second extension pin to create a first tier at a first vertical distance above the base.

A two-tiered modular home beer brewing stand can be assembled by extending the single tiered stand described above wherein the male end of the support post of a second module is inserted into the female end of the support post of the first module and secured with a third extension pin to create a second tier at a second vertical distance above the base, wherein the first vertical distance is different from the second vertical distance.

A three-tiered modular home beer brewing stand can be assembled by extending the two tiered stand described above, wherein the male end of the support post of a third module is inserted into the female end of the support post of the second module and secured with a fourth extension pin to create a third tier at a third vertical distance above the base, wherein the first, second and third vertical distances differ from one another, respectively. The first, second, third and fourth extension pins are preferably all identical in shape and size.

The above and other aspects of the present invention will become apparent in view of the following description, claims and drawings.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

The exemplary beer brewing stand, system or kit 10 of FIG. 1 contains a base 20 and various modules to be described herein below. The stand 10 shows three tiers or vertical levels 30, 32, 34 mounted onto the base 20. The stand 10 is completely modular with components that can either slide into one another, snap together, or fit together easily by hand without the need for any tools for assembly or dis-assembly.

Figure 1:
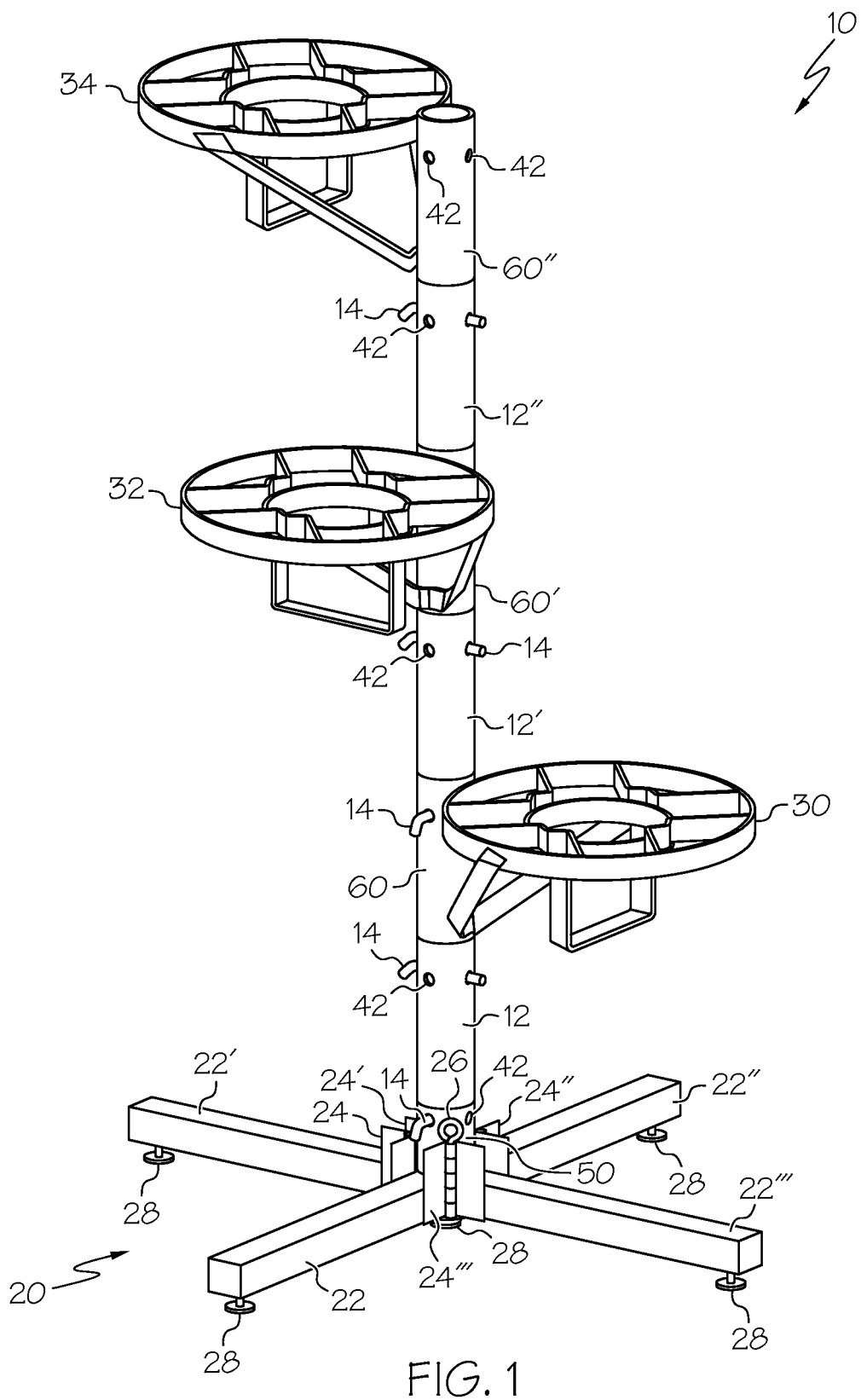
FIG. 1 is a front perspective view of a preferred embodiment of a modular beer brewing stand according to the principles of the invention.
Figure 2:
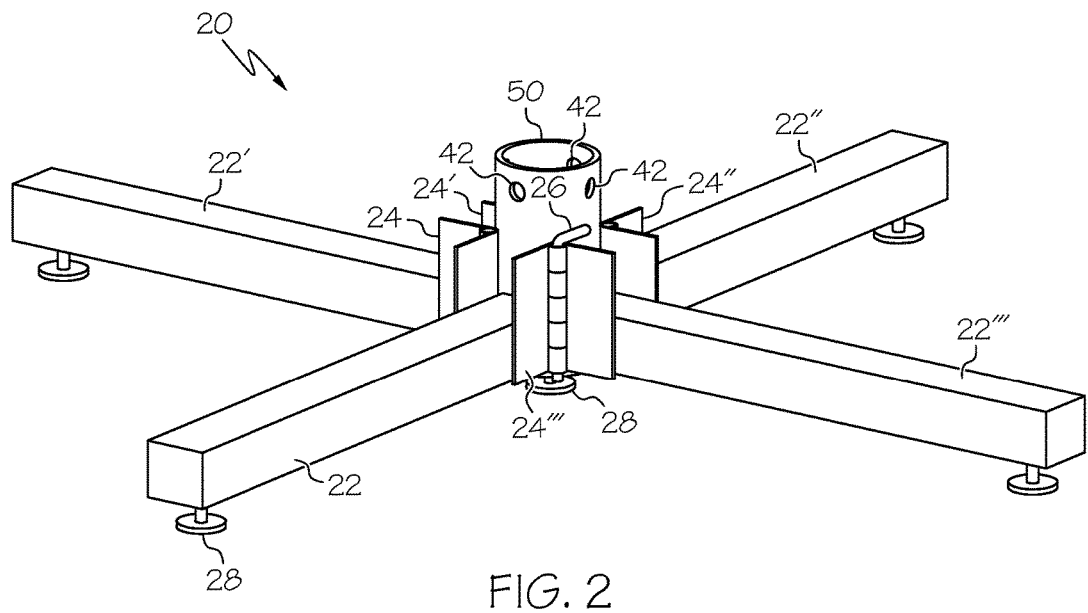
FIG. 2 is a top perspective view of a preferred embodiment of a base in an open position for use with the beer brewing stand of FIG. 1 according to the principles of the invention.
Figure 3:
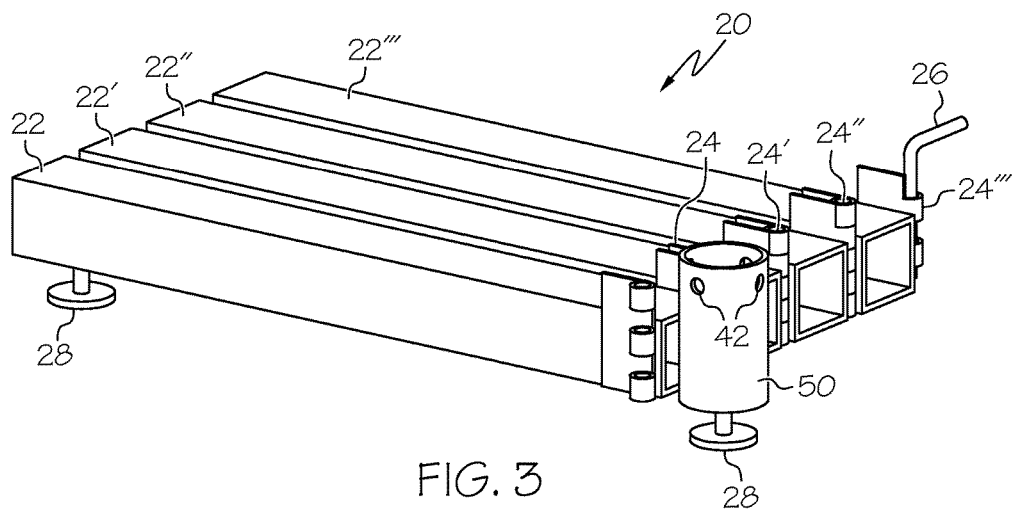
FIG. 3 is a top perspective view of the base of FIG. 2 in a folded/closed position to be stored or transported for future use with the beer brewing stand of FIG. 1 according to the principles of the invention.

The stand base 20 is shown in an open position in FIG. 2 ready to support and enable construction of the stand, and in a closed or folded position in FIG. 3. The base 20 includes a center post 50 which can be a cylindrical tube or pipe of ⅛th inch steel that extends about 6 inches from the ground level and includes four through holes 42, whereby each through hole is aligned with one of the legs 22, 22', 22", 22"' when the base 20 is in the open position. The base 20 can include 3 or more legs whereby a first leg 22 is fixedly attached such as by a weld to the center post 50 and further attached to a second leg 22' via a first hinge 24. The second leg 22' is further attached to a third leg 22" via a second hinge 24', and the third leg 22" is attached to a fourth leg 22'" with yet a fourth hinge 24". The hinges are fixedly attached to the legs as shown in FIGS. 2 and 3. When dis-assembled, the base 20 can be folded into a compact unit for easy storage and transport. The base 20 preferably contains adjustable, non-slipping feet 28 made, for instance, of hard rubber (see FIG. 1) and located under each leg and under the center post.

To assemble the stand 10 first the legs 22, 22', 22", 22'" of the base 20 are moved into the open position whereby the legs surround the center post 50 as shown in FIG. 2, and then a leg pin 26 (FIG. 1) is inserted into a hole or slot in hinge 24'" to secure the first and fourth legs together, completing assembly of the base.

The base 20 can be constructed of 2×2 inch legs of ⅛th inch steel that preferably extend evenly spaced apart for 18 to 24 inches from the center post 50. Each leg of a 4 legged base is positioned 90 degrees apart from each adjacent leg whereas, each leg of a 3 legged base is positioned 120 degrees apart from each adjacent leg.

The stand can be customized by selecting and adding various modules onto the base, such as: an extension tube module for extending a height of the stand; a shelf module for extending the height of the stand and adding a cantilever shelf; a burner module for extending the height of the stand and including a burner assembly; a pump module for extending the height of the stand and including a mounting bracket for a pump; a heat exchanger module for extending the height of the stand and including a mounting bracket for a heat exchanger; a plumbing module for extending the height of the stand and including a mounting bracket for mounting plumbing for gas or water; a temperature controller module for extending the height of the stand and including a mounting bracket for a temperature controller; and a grill module for extending the height of the stand and including a gas grill module for cooking.

Figure 4:
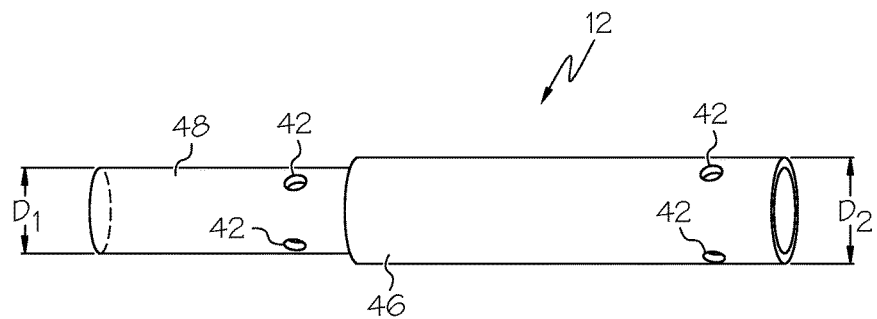
FIG. 4 is side view of a preferred embodiment of a specific extension module referred to as an extension tube module for use with the beer brewing stand of FIG. 1.

When building the stand 10 of FIG. 1, first an extension tube module 12 is added to the base 20 to provide additional height. An exemplary extension tube module 12 is illustrated in FIG. 4 which includes a male section 48 having a diameter $D_1$ and a female section 46 having a diameter $D_2$ where $D_2 > D_1$ and $D_2 \geq 2$ inches. The female section 46 is preferably the same diameter as the center post 50 shown in FIG. 2 whereby the male section 48 of the extension tube module 12 has a slightly smaller diameter so that it can slide into and fit snugly into the center post 50, thereafter being secured with a first extension pin 14 inserted through a pair of holes 42. The section 46 of the extension tube module 12 is preferably 9 inches long, although different length extension tube modules can be used as well. When the extension tube module 12 is inserted into the center post 50, the holes 42 in the extension tube module 12 and the holes 42 in the center post 50 are aligned and an extension pin 14 is slid therethrough to prevent rotation or other movement between the base 20 and the extension tube module 12. Preferably all of the holes 42 in the various components of the stand 10 will have the same diameter so that same sized extension pins 14 can be used to secure the parts together when inserted into the holes. Thus all extension pins are preferably identical. Moreover, it is preferred that each extension pin (or leg pin) shall be attached to its respective component via a lanyard so that the pin and component will always be attached to one another and the pin will always be available when needed. The lanyard for this invention is described as a short piece of rope, wire, plastic tie or the like that is fastened to a pin and to a stand component, such as an extension module so that the pin and the particular stand component will always be together when assembled, moved or stored.

Figure 5:
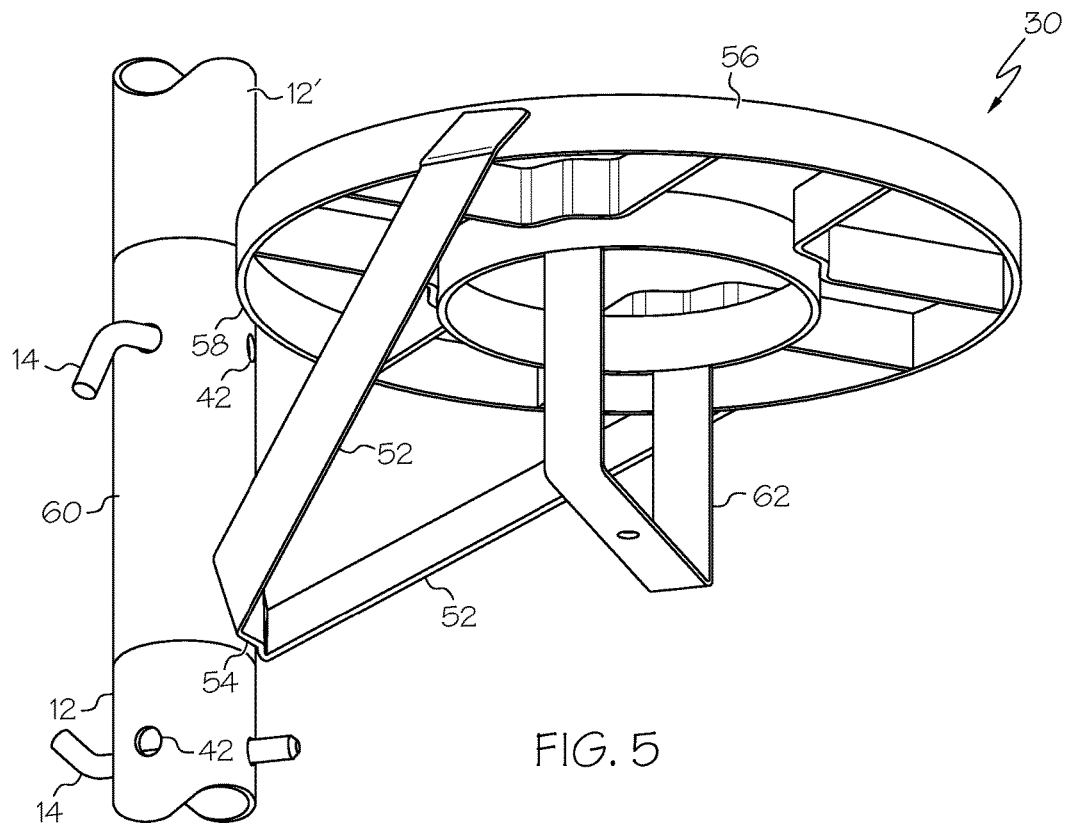
FIG. 5 is a bottom side perspective view of a preferred embodiment of a burner module for use with the beer brewing stand of FIG. 1.

One type of module available for the stand 10 is a burner module or burner assembly 30, illustrated in FIG. 5, which includes a burner support member 62, stabilizing bars 52 and a shelf 56 of cross members or grates for kettle support which has been welded to an extension tube module 60 at welds 54 and 58.

Other modules not shown in the drawings could be added to the home brewing stand kit such as, but not limited to: a shelf module for extending the height of the stand and adding a cantilever shelf; a pump module for extending the height of the stand and including a mounting bracket for a pump; a heat exchanger module for extending the height of the stand and including a mounting bracket for a heat exchanger; a plumbing module for extending the height of the stand and including a mounting bracket for mounting plumbing for gas or water; a temperature controller module for extending the height of the stand and including a mounting bracket for a temperature controller; and a grill module for extending the height of the stand and including a gas grill module for cooking Each type of module, such as those identified above, can include a male portion and a female portion similar to the extension tube module 12 of FIG. 4 so that the modules can build vertically upon one another as shown in FIG. 1.

The exemplary stand 10 of FIG. 1 includes 3 tiers or elevation levels 30, 32 and 34 although in different embodiments any number of tiers could be added. For example a single tier stand would only include the tier 30, a two tier stand would only include tiers 30 and 32, and the three tier stand as shown includes tiers 30, 32, 34. The stand 10 of FIG. 1 includes a four legged base 20, a first extension tube module 12 mounted into the base, a first tier burner module 30 mounted into the first extension tube module 12, a second extension tube module 12' mounted into the burner module 30, a second tier burner module 32 mounted into the second extension tube module 12', a third extension tube module 12" mounted into the burner module 32, and a third tier burner module 34 mounted into the third extension tube module 12". One of the advantages of using cylindrical pipes for connecting each of the modules when building the stand is that each of the modules can be rotated or moved into a desired position without first disassembling the stand. However, each of the tier modules 30, 32, 34 preferably should line up with the stand legs as shown in FIG. 1 for stability.

The height of each tier of the brewing stand 10 can be adjusted by adding or removing extension tube modules 12 between tiers. Also, each module and the stand post could be manufactured to provide any desired length, diameter, or dimension to provide a desired height or distance between the modular stand components which, in turn, would alter the height of the various tiers from one another and from the ground level. The center post and extension tube modules could be any shape, material or thickness such as a square 2×2 inch steel rectangular tube of ⅛ inch thickness, a 2 inch diameter cylindrical pipe, a triangular shaped pipe of ¼ inch thick steel, metal, plastic, etc.

In the above described embodiment the center post measures 6 inches from the floor (i.e. the ground level), the extension tube module measures 9 inches in length and the overall burner module lengths are each 18 inches. Thus the stand of FIG. 1 has a first tier 30 that is 24 inches in height from the floor, a second tier 32 that is 42 inches in height from the floor, and a third tier 34 that is 60 inches in height from the floor. Each additional module thereafter would increase the overall stand height by 18 inches.

In other embodiments the 9 inch extension tube modules 12 could be replaced with shorter or longer extension tube modules or the extension tube modules could be completely removed from the stand and the burner modules could be shorter in length, resulting in the first tier 30 located 15 inches from the floor, the second tier 32 located 33 inches from the floor, and the third tier 34 located 51 inches from the floor.

The stand 10 is completely modular so that an individual can easily and quickly open the base legs and secure it in the open position with a leg pin, then add whatever modules he/she requires, for each module merely sliding the pieces together and securing each piece with an extension pin. No tools or special skills are necessary and the disassembled stand components can be easily and quickly moved and stored. There are no nut and bolts or other hardware that is needed to be tightened and adjusted, and no tools necessary for assembly or dis-assembly. Each module is a separate complete unit.

Although the above preferred embodiment defines certain dimensions, such as component lengths, heights, materials, etc. all of these dimensions and materials can be changed to manufacture various size and shape home beer brewing stands of any material.

While the invention has been shown and described with reference to specific embodiments, it should be understood by those skilled in the art that various changes in form and detail may be made therein without departing from the spirit and scope of the invention.

What is claimed is:

1. A modular stand used to facilitate home beer brewing, comprising:
a base including a center post and three or more adjustable legs, a first leg fixedly attached to the center post such that the first leg does not move relative to the center post, a second leg rotatably coupled to the first leg and rotatably coupled to a last leg, wherein the second leg is not directly coupled to the center post, wherein the first leg, the second leg, and the last leg remain rotatably coupled in a folded position, and wherein at least a portion of each of the first leg, the second leg, and the last leg is adapted to contact a surface to maintain the center post in a vertical orientation;
a leg pin to connect the first leg with the last leg when assembling the base on a ground level to secure the legs into fixed evenly spread positions surrounding the center post when in an open position; and
a first one-piece module comprising (1) a first support post having a female end and a male end, wherein the male end is inserted into the center post to extend a height of the center post and the stand vertically above the ground level, and (2) a first cantilever assembly integrally connected to the first support post and extending away from the first support post,
wherein said first one-piece module is selected from the group consisting of; a shelf module including a cantilever shelf integrally attached to the first support post; a burner module including a burner assembly integrally attached to the first support post; a pump module including a mounting bracket integrally attached to the first support post, for a pump; a heat exchanger module including a mounting bracket integrally attached to the first support post, for a heat exchanger; a plumbing module including a mounting bracket integrally attached to the first support post, for mounting plumbing for gas or water; a temperature controller module including a mounting bracket integrally attached to the first support post, for a temperature controller; and a grill module including a gas grill module integrally attached to the first support post, for cooking.

2. The stand of claim 1 further comprising an extension post positioned between the base and the first one-piece module, said extension post including a female end and a male end, wherein the male end of the extension post is inserted into the center post and the male end of the first one-piece module is inserted into the female end of the extension post.

3. The stand of claim 1 further comprising: a second one-piece module including: a second support post having a female end and a male end, wherein the male end of the second module support post is inserted into the female end of the first module support post; and a second cantilever assembly integrally connected to the second support post and extending away from the second support post.

4. The stand of claim 3 wherein said second one-piece module is selected from the group consisting of; a shelf module including a cantilever shelf integrally attached to the second support post a burner module including a burner assembly integrally attached to the second support post a pump module including a mounting bracket integrally attached to the second support post, for a pump; a heat exchanger module including a mounting bracket integrally attached to the second support post, for a heat exchanger; a plumbing module including a mounting bracket integrally attached to the second support post, for mounting plumbing for gas or water; a temperature controller module including a mounting bracket integrally attached to the second support post, for a temperature controller; and a grill module including a gas grill module integrally attached to the second support post, for cooking.

5. The stand of claim 1 wherein the center post is a metal cylindrical tube having a thickness of about 0.125 inches and extending vertically 6 inches from the ground level.

6. The stand of claim 1 wherein the base legs are 2×2×24 inch steel having a thickness of 0.125 inches.

7. The stand of claim 1 wherein the support post of the first one-piece module is 9 inches in length.

8. The stand of claim 1 wherein the burner assembly further comprises: a burner grate, a wind shield, a valve and a burner.

9. The stand of claim 1 wherein the male end of the first module is inserted into the center post and secured with a first extension pin.

10. The stand of claim 1 further comprising feet located under each leg and the center post.

11. The stand of claim 1 further comprising lanyards for securing the leg pin to the last leg and the center post, respectively.

12. A modular home beer brewing stand, comprising:
a base with three or more foldable legs, a first leg being permanently attached to a cylindrical center post around which the other legs are hinged to one another and unfolded into an open position when the base is assembled, a last leg being attachable to the first leg during assembly with no tool via a hand inserted first pin, said legs folding together into a folded position via the hinges when the first pin is removed and the base is dis-assembled, wherein a second leg is not directly coupled to the center post, wherein the first leg, the second leg, and the last leg remain rotatably coupled in the folded position, and wherein at least a portion of each of the first leg, the second leg, and the last leg is adapted to contact a surface to maintain the center post in a vertical orientation; and a plurality of one-piece modules each comprising (1) a cylindrical support post having a female end and a male end, and (2) a cantilever assembly integrally attached to the support post and extending away from the support post, wherein the male end of the support post of a first of the plurality of one-piece modules is inserted into the center post to create a first tier at a first vertical distance above the base, and the male end of the support post of a second of the plurality of one-piece modules is inserted into the female end of the first one-piece module to interlock the first and second one-piece modules and to create a second tier at a second vertical distance above the base, wherein the plurality of one-piece modules is selected from the group consisting of: a shelf module including a cantilever shelf and integrally attached support post; a burner module including a burner assembly and integrally attached support post; a pump module including a mounting bracket and integrally attached support post, for a pump; a heat exchanger module including a mounting bracket and integrally attached support post, for a heat exchanger; a plumbing module including a mounting bracket and integrally attached support post, for mounting plumbing for gas or water; a temperature controller module including a mounting bracket and integrally attached support post, for a temperature controller; and a grill module including a gas grill support bracket and integrally attached support post, for cooking.

13. The modular home beer brewing stand of claim 12, wherein the plurality of one-piece modules further comprises a third one-piece module and the male end of the support post of the third one-piece module is inserted into the female end of the second one-piece module to interlock the second and third one-piece modules and create a third tier at a third vertical distance above the base.

14. The modular home beer brewing stand of claim 13, wherein adjacent interlocking support posts of the plurality of one-piece modules are secured with extension pins.

15. The modular home beer brewing stand of claim 13, further comprising one or more extension posts inserted between modules, each said extension post including a male end for insertion into a one-piece module below the extension post, and a female end for receiving the male end of a one-piece module above the extension post.

16. A modular stand used to facilitate home beer brewing, comprising:
a base including a center post and three or more adjustable legs, a first leg fixedly attached to the center post such that the first leg does not move relative to the center post, a second leg rotatably coupled to the first leg and rotatably coupled to a last leg, wherein the second leg is not directly coupled to the center post, wherein the first leg, the second leg, and the last leg remain rotatably coupled in a folded position, and wherein at least a portion of each of the first leg, the second leg, and the last leg is adapted to contact a surface to maintain the center post in a vertical orientation;
a leg pin to connect the first leg with the last leg when assembling the base on a ground level to secure the legs into fixed evenly spread positions surrounding the center post when in an open position; and
a first one-piece module comprising (1) a first support post having a female end and a male end, wherein the male end is inserted into the center post to extend a height of the center post and the stand vertically above the ground level, and (2) a first cantilever assembly integrally connected to the first support post and extending away from the first support post;
a second one-piece module including: a second support post having a female end and a male end, wherein the male end of the second module support post is inserted into the female end of the first module support post; and a second cantilever assembly integrally connected to the second support post and extending away from the second support post,
wherein said second one-piece module is selected from the group consisting of; a shelf module including a cantilever shelf integrally attached to the second support post a burner module including a burner assembly integrally attached to the second support post a pump module including a mounting bracket integrally attached to the second support post, for a pump; a heat exchanger module including a mounting bracket integrally attached to the second support post, for a heat exchanger; a plumbing module including a mounting bracket integrally attached to the second support post, for mounting plumbing for gas or water; a temperature controller module including a mounting bracket integrally attached to the second support post, for a temperature controller; and a grill module including a gas grill module integrally attached to the second support post, for cooking.

17. A modular stand used to support one or more accessories for home beer brewing, the modular stand comprising:
a base assembly that is displaceable between a folded position and an open position, the base assembly comprising:
a center post that extends along a center post axis;
a first leg extending from a first end to a second end, the first end of the first leg being fixedly secured to a portion of the center post in the folded position and the open position;
a second leg extending from a first end to a second end, the first end of the second leg being rotatably coupled to the first end of the first leg and such that the second leg is rotatable relative to the first end of the first leg; and
a third leg extending from a first end to a second end, the first end of the third leg being rotatably coupled to the first end of the second leg such that the third leg is not directly coupled to the center post,
wherein when the base assembly is in the folded position, the first end of the second leg is disposed between the first end of the third leg and the first end of the first leg, the first end of the third leg is offset from the center post, and the first leg, the second leg, and the third leg remain rotatably coupled, and
wherein when the base assembly is in the open position, the first end of the third leg is adjacent to or in contact with the center post; and
a main support post extending along a main support post axis from a first end to a second end, the first end of the first support post adapted to be coupled to the center post of the base assembly such that the main support post axis is coaxially-aligned with the center post axis; and
a first cantilever assembly coupled to a portion of the main support post, the first cantilever assembly extending in a direction normal to the main support post axis and adapted to support a first accessory of the one or more accessories for home beer brewing.

18. The modular stand of claim 17, further comprising:
a fourth leg extending from a first end to a second end, the first end of the fourth leg being rotatably coupled to the first end of the third leg such that the fourth leg is not directly coupled to the center post, wherein when the base assembly is in the folded position, the first end of the third leg is between the first end of the fourth leg and the first end of the second leg, and when the base assembly is in the folded position the first end of the fourth leg is offset from the center post, and when the base assembly is in the open position, the first end of the fourth leg is adjacent to or in contact with the center post, and when the base assembly is in the open position, the first end of the fourth leg is adjacent to or in contact with the first end of the first leg.

19. The modular stand of claim 17, wherein when the base assembly is in the open position, the first end of the third leg is adjacent to or in contact with the first end of the first leg.

20. The modular stand of claim 18, wherein the first leg extends along a first leg axis from the first end to the second end, the second leg extends along a second leg axis from the first end to the second end, and the third leg extends along a third leg axis from a first end to a second end, and a fourth leg extending along a fourth leg axis from a first end to a second end, and
wherein in the folded position, the first leg axis, the second leg axis, the third leg axis, and the fourth leg axis are parallel.

21. The modular stand of claim 20, wherein in the open position, the first leg axis forms a right angle with the second leg axis, the second leg axis forms a right angle with the third leg axis, the third leg axis forms a right angle with the fourth leg axis, the fourth leg axis forms a right angle with the first leg axis.

22. The modular stand of claim 18, wherein the first end of the second leg rotates relative to the first end of the first leg about a first leg rotational axis that is parallel to the center post axis, the first end of the third leg rotates relative to the first end of the second leg about a second leg rotational axis that is parallel to the center post axis, the first end of the fourth leg rotates relative to the first end of the third leg about a third leg rotational axis that is parallel to the center post axis.

23. The modular stand of claim 17, wherein the first end of the second leg is displaceable relative to the center post when the first end of the second leg rotates relative to the first end of the first leg.

24. The modular stand of claim 18, further comprising a pin removably coupled to the first end of the first leg and the first end of the fourth leg when the base assembly is in the open position to secure the base assembly is in the open position.

25. The modular stand of claim 19, further comprising a pin removably coupled to the first end of the first leg and the first end of the third leg when the base assembly is in the open position to secure the base assembly is in the open position.

26. The modular stand of claim 18, wherein a first hinge portion of a first hinge is coupled to a first portion of the first end of the first leg and a second hinge portion of the first hinge is coupled to a first portion of the first end of the second leg such that the first end of the second leg is rotatably coupled to the first end of the first leg by the first hinge;
a first hinge portion of a second hinge is coupled to a second portion of the first end of the second leg and a second hinge portion of the second hinge is coupled to a first portion of the first end of the third leg such that the first end of the second leg is rotatably coupled to the first end of the third leg by the second hinge; and
a first hinge portion of a third hinge is coupled to a second portion of the first end of the third leg and a second hinge portion of the third hinge is coupled to a first portion of the first end of the fourth leg such that the first end of the third leg is rotatably coupled to the first end of the fourth leg by the third hinge.

27. The modular stand of claim 26, wherein a removable pin secures a first locking member coupled to a second portion of the first end of the first leg to a second locking member coupled to a second portion of the first end of the fourth leg when the base assembly is in the open position.

28. The modular stand of claim 19, wherein a first hinge portion of a first hinge is coupled to a first portion of the first end of the first leg and a second hinge portion of the first hinge is coupled to a first portion of the first end of the second leg such that the first end of the second leg is rotatably coupled to the first end of the first leg by the first hinge;
a first hinge portion of a second hinge is coupled to a second portion of the first end of the second leg and a second hinge portion of the second hinge is coupled to a first portion of the first end of the third leg such that the first end of the second leg is rotatably coupled to the first end of the third leg by the second hinge; and
a removable pin secures a first locking member coupled to a second portion of the first end of the first leg to a second locking member coupled to a second portion of the first end of the third leg when the base assembly is in the open position.

29. The modular stand of claim 17, wherein the main support post includes a first support post extending along a first support post axis from a first end to a second end, the first end of the first support post adapted to be coupled to the center post of the base assembly such that the first support post axis is a first portion of the main support post axis and is coaxially-aligned with the center post axis; and
wherein the main support post includes a second support post extending along a second support post axis from a first end to a second end, the first end of the first support post adapted to be coupled to the second end of the first support post such that the second support post axis is a second portion of the main support post axis and is coaxially-aligned with the first support post axis.

30. The modular stand of claim 29, wherein the first cantilever assembly is coupled to the second support post, and the first support post is an extension tube.

* * * * *